(12) United States Patent
Fleming

(10) Patent No.: US 6,306,459 B1
(45) Date of Patent: Oct. 23, 2001

(54) RETROFLECTIVE ARTICLE HAVING A COLORED LAYER CONTAINING REFLECTIVE FLAKES AND A DYE COVALENTLY BONDED TO A POLYMER

(75) Inventor: Robert J. Fleming, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/453,321

(22) Filed: Dec. 2, 1999

Related U.S. Application Data

(62) Division of application No. 09/335,068, filed on Jun. 17, 1999.

(51) Int. Cl.$^7$ ............................ B05D 5/06; G02B 5/128
(52) U.S. Cl. ................................................ 427/163.4
(58) Field of Search ............................. 427/163.1, 163.4

(56) References Cited

U.S. PATENT DOCUMENTS

| | | |
|---|---|---|
| 2,567,233 | 9/1951 | Palmquist et al. . |
| 3,420,597 | 1/1969 | Nellessen et al . . |
| 3,758,192 | 9/1973 | Bingham . |
| 3,879,336 * | 4/1975 | Maeda et al. .................... 528/62 |
| 4,026,931 | 5/1977 | Wiesel et al. . |
| 4,102,562 | 7/1978 | Harper et al. . |
| 4,284,729 | 8/1981 | Cross et al. . |
| 4,507,407 | 3/1985 | Kluger et al. . |
| 4,533,592 | 8/1985 | Bingham . |
| 4,678,695 | 7/1987 | Tung et al. . |
| 4,763,985 | 8/1988 | Bingham . |
| 5,200,262 | 4/1993 | Li . |
| 5,283,101 | 2/1994 | Li . |
| 5,344,705 | 9/1994 | Olsen . |
| 5,451,447 | 9/1995 | Li . |
| 5,474,827 * | 12/1995 | Crandall et al. ....................... 428/67 |
| 5,503,906 | 4/1996 | Olsen . |
| 5,612,119 | 3/1997 | Olsen et al. . |
| 5,620,613 | 4/1997 | Olsen . |
| 5,645,938 | 7/1997 | Crandall . |
| 5,679,198 | 10/1997 | Olsen et al. . |
| 5,695,853 | 12/1997 | Billingsley et al. . |
| 5,812,317 * | 9/1998 | Billingsley et al. .................. 359/536 |
| 5,837,347 | 11/1998 | Marecki . |

FOREIGN PATENT DOCUMENTS

| | | |
|---|---|---|
| 0 683 403 A2 | 11/1995 | (EP) . |
| WO 95/31739 | 11/1995 | (WO) . |
| WO 96/16343 | 5/1996 | (WO) . |
| WO 97/10378 | 3/1997 | (WO) . |
| WO 98/28642 | 7/1998 | (WO) . |
| WO 99/21937 | 5/1999 | (WO) . |

OTHER PUBLICATIONS

Reactint Polyurethane Colorants, Milliken Chemicals, R–307–13, R–307–15, Jul. 1995.

* cited by examiner

Primary Examiner—Shrive P. Beck
Assistant Examiner—Michael Cleveland
(74) Attorney, Agent, or Firm—Karl G. Hanson; Frank S. Rosenberg

(57) ABSTRACT

Exposed lens retroreflective article 10 that comprises a colored layer 14 and a layer of optical elements 12 that are partially embedded in the colored layer 14. The colored layer 14 comprises reflective flakes 16 and a dye that is covalently bonded to a polymer 18. The articles can retain their color after multiple industrial wash cycles. The use of a reactive dye, reflective flakes, and/or polymer precursor during the preparation of the colored layer enables a launderably-durable colored retroreflective article to be made without the use of a solvent and without the use of a temporary carrier.

6 Claims, 1 Drawing Sheet

RETROFLECTIVE ARTICLE HAVING A COLORED LAYER CONTAINING REFLECTIVE FLAKES AND A DYE COVALENTLY BONDED TO A POLYMER

This is a divisional of application Ser. No. 09/335,068 filed Jun. 17, 1999.

The present invention pertains to a retroreflective article that includes a colored layer that contains reflective flakes and a dye. The dye is covalently bonded to a polymer.

BACKGROUND

Persons who work or exercise near motor vehicle traffic can be made safer by wearing clothing that highlights the person's presence to passing motor vehicles. To promote the safety of roadway workers and pedestrians, clothing manufacturers commonly produce bright clothing to make the wearer more conspicuous. Manufacturers also regularly secure retroreflective articles to the outer surface of the clothing to improve wearer conspicuity. Retroreflective articles are passive devices that return incident light back toward the light source. The articles highlight a person's presence to motorists at nighttime by reflecting light from the motor vehicle's headlamps back to the motor vehicle driver. The bright image displayed by the retroreflective article ultimately gives motorists more time to react.

Sometimes the retroreflective articles are colored for aesthetic reasons or to provide enhanced contrast for better daytime visibility. Frequently, fluorescent colors are used in conjunction with retroreflective sheeting to make the sheeting more conspicuous under daytime viewing conditions (see, for example, U.S. patent application Ser. No. 08/587,339 or corresponding International Publication WO 95/31739 and U.S. Pat. Nos. 3,830,682, 5,387,458, and 5,695,853).

Because retroreflective articles are regularly used on clothing, they must be able to withstand laundering conditions - otherwise, the articles cannot continue to serve their safety function after repeated washings. Investigators at the 3M Company who design retroreflective articles for use on clothing are aware of this problem, and they have developed launderably-durable retroreflective articles so that persons who wear retroreflective clothing remain conspicuously visible after their clothing has been laundered many times. U.S. Pat. Nos. 5,200,262, 5,283,101, 5,474,827, 5,645,938, 5,738,746, and 5,812,317 disclose examples of launderably durable retroreflective articles developed at 3M. These products typically comprise optical elements that are partially embedded in a specially formulated binder layer.

Investigators also recognize that the need to develop launderably durable retroreflective articles is particularly pronounced for clothing that regularly is worn in harsh environments. Examples of such clothing include firemen's jackets and construction workers' safety vests (see, for example, U.S. Pat. No. 4,533,592 to Bingham). These garments tend to get very dirty, very often, and therefore they are frequently cleaned under industrial laundering conditions. Industrial laundering conditions involve wash temperatures as high as 40 to 90° C. (105 to 190° F.) and pH values of 10 to 13. Some of the launderably durable retroreflective articles disclosed in the 3M patents mentioned above are capable of withstanding the more stringent industrial wash conditions.

In some retroreflective articles, a colored appearance has been achieved by placing a colored polymeric layer on top of the optical elements. Retroreflective articles that contain optical elements partially embedded in a polymeric top layer (also referred to as a cover film) are commonly referred to as "enclosed lens" retroreflective articles. In addition to providing color, the polymeric top film allows the article to be easily wiped clean, and the articles generally exhibit good retroreflective when wet. Examples of patents that disclose colored top films include U.S. Pat. Nos. 5,069,964 and 5,378,520. In these retroreflective articles, a dye or pigment is added to the top film. Commercially available products that have a colored top film include 3M Scotchlite™ 7960 and 7987 brand products.

An alternative to enclosed lens retroreflective articles are "exposed lens" retroreflective articles, which have the optical elements exposed to the ambient environment—that is, the optical elements are not covered by a polymeric top film. These articles generally include an exposed layer of transparent microspheres, a polymeric binder layer, and a reflective layer. The transparent microspheres are partially embedded in the binder layer and are partially exposed to the atmosphere, and the reflective layer is generally disposed between the microspheres and the binder layer.

Another kind of retroreflective article is an "encapsulated lens" retroreflective article. These articles are similar to enclosed lens articles in that they employ a top film over the layer of microspheres. Encapsulated lens retroreflective articles, however, differ from enclosed lens articles by having the top film encapsulate a pocket of air above the layer of microspheres. U.S. Pat. No. 4,025,159 to McGrath, U.S. Pat. No. 4,896,943 to Tolliver et al., U.S. Pat. No. 4,897,136 to Bailey et al., and U.S. Pat. No. 5,069,964 to Tolliver et al. disclose examples of encapsulated lens type products. In one variation of an encapsulated lens retroreflective sheeting (disclosed by Tung et al. in U.S. Pat. No. 4,678,695), transparent microspheres are partially embedded in a binder layer, and a clear or colored top film is disposed over the microspheres. The binder layer may be impregnated with a white pigment, or, alternatively, with a colored pigment to make a sheeting that displays a corresponding daytime color and exhibits nighttime reflection.

These three systems, exposed lens, enclosed lens, and encapsulated lens sheetings, have various advantages and disadvantages relative to one another, and coloring techniques applicable to one system are not necessarily applicable to the other. Exposed lens articles tend to be more flexible and simpler in construction but cannot be colored simply by including a dye in a top film because the articles have no top film. Enclosed lens and encapsulated lens articles, while being somewhat easier to color, generally suffer from the drawback of not being very useful at high temperatures because the polymeric top film can melt. Enclosed lens and encapsulated lens articles, therefore, do not rate as high as exposed lens articles when considering candidates for use on firefighters' jackets.

A variety of methods, however, have been employed to impart color to exposed lens retroreflective articles. In U.S. Pat. No. 3,700,305, for example, Bingham discloses an exposed lens retroreflective article that has alternating layers of different refractive index dielectric materials coated on glass microspheres. A colored layer, such as a fluorescent layer, is applied behind the dielectric reflector. Because the dielectric reflector is essentially transparent under daytime viewing conditions, the fluorescent layer imparts a daytime fluorescent color to the article. Under nighttime or retroreflective viewing conditions, however, the article is basically incapable of displaying the color of the underlying colored layer because incident light never strikes that layer: it is first reflected by the dielectric reflector back towards the light source. The patent is silent regarding durability under home wash or industrial laundering conditions.

Other methods of coloring an exposed lens retroreflective article are discussed briefly in U.S. Pat. Nos. 3,758,192, 4,102,562, and 5,200,262. In U.S. Pat. No. 3,758,192, Bingham discloses an exposed lens retroreflective article that has transparent microspheres partially embedded in a binder layer that contains flakes of nacreous (pearlescent) pigment and other various pigments or dyes. While this product can display a colored retroreflective image, there is nothing in the patent which shows that the product would be industrial wash durable. In U.S. Pat. No. 4,102,562 to Harper et al., an exposed lens retroreflective article is disclosed that can display a colored imagewise pattern. The article has transparent microspheres coated with a transparent dielectric mirror prepared as described in U.S. Pat. No. 3,700,305 to Bingham An ink layer that contains a pigment and a melamine is applied behind the reflective layer (see Example 2). Harper et al. state that the melamine reacts with the epoxide moiety of the adhesion promoting silane (see Example 2). Because the ink layer is disposed behind the reflective layer, the article, while being able to display the colored image under daytime viewing conditions, is not capable of displaying a colored retroreflective image. The patent also does not show that the retroreflective articles would be durable under industrial wash conditions. Wu-Shyong Li, in U.S. Pat. No. 5,200,262, partially embeds transparent microspheres in a binder layer that may be colored by a pigment or dye, preferably a black dye such as a chromium-azo dye. Li suggests the use of a metal layer or dielectric material as a reflector. The reflector is located on the embedded portion of the transparent microspheres. When a metal reflective layer is used, the color of the underlying binder layer is not noticeable under daytime or nighttime viewing conditions. And when a dielectric reflector is used, the color of the underlying binder layer is not noticeable under nighttime (i.e., retroreflective) viewing conditions. Li's product is, however, designed to withstand industrial wash conditions.

Ulf Olsen, in U.S. Pat. Nos. 5,344,705, 5,503,906, and 5,620,613, discloses exposed lens retroreflective articles that have a color layer printed on the embedded portion of a layer of transparent microspheres. The color layer typically contains a transparent pigment or dye that is substantially uniformly dispersed in a transparent resin. The color layer is disposed between the microspheres and a reflective layer, which reflective layer comprises reflective flakes in a transparent resin. Olsen also discloses that the color layer and the reflective layer may be replaced by a colored reflective layer comprising both colorant and reflective flakes in a transparent resin. While this product can display a colored image under retroreflective conditions, it does not indicate that good wash durability can be achieved under industrial wash conditions.

In U.S. Pat. Nos. 5,510,178, 5,612,119, 5,679,198, and 5,785,790, Ulf Olsen describes an exposed lens retroreflective product that has an imagewise colored coating disposed behind a transparent dielectric mirror that is coated on the backside of microspheres partially embedded in a binder layer. The colored image in this product is, however, not noticeable under retroreflective conditions; it can only be seen under daytime lighting conditions.

SUMMARY OF THE INVENTION

The present invention provides a new, exposed lens retroreflective article that can exhibit color under retrore-flective conditions and that can demonstrate extraordinary durability under industrial wash conditions. In brief summary, the exposed lens retroreflective article comprises a layer of optical elements that are partially embedded in a colored layer that contains reflective flakes and a dye. The dye is covalently bonded to a polymer. Unlike conventional colored layers, which contain pigments or dyes that are physically suspended within a polymeric matrix, the dye in the colored layer of the present invention is connected to the polymer molecule by a covalent bond that is believed to prevent the dye from washing out of the material even under the harsh conditions of industrial laundering.

In another aspect, the present invention provides a new transfer article for supplying a retroreflective article to a garment assembler. In a further aspect, the invention provides an article of clothing that has the inventive retroreflective article disposed on its outer surface.

The colored, exposed lens retroreflective articles of the invention can provide good retroreflective and color even after multiple episodes of industrial laundering. The inventive articles also can display bright and intense colors. The laundering durability and good color performance makes the articles suitable for use on safety garments such as construction workers' safety vests and firefighters' jackets.

The invention further provides a method of making a retroreflective article in which a precursor color coating contacts optical elements. The precursor color coating comprises reflective flakes, a polymer precursor, and a reactive dye. The reactive dye has a functional group or groups that will react with the polymer precursor. The precursor color coating preferably does not contain solvent. The inventive methods are advantageous over conventional methods that use solid colorants (which may impart undesirable stiffness to a retroreflective article) and are advantageous over methods that use unreactive liquid colorants and plasticizers (which have a tendency to migrate out of articles during laundering). The present invention can achieve a colored daytime, and possibly colored nighttime image without the use of such ingredients.

In preparing colored, reflective layers it has been known that the higher the loading level of reflective flakes, the higher the reflectivity—and, likewise, the higher the loading level of colorants, the deeper the color. A practical limitation to the loading level of solid pigments is an increase in viscosity whereby the mixture no longer flows and makes mixing and coating difficult or impossible. Poor processability of a high viscosity mixture can lead to poor physical properties of the final reflective layer. In the past, an answer to this problem typically has been to add solvent to decrease coating solution viscosity. In the inventive method, a reactive liquid colorant can be used, which enables higher levels of reflective flakes and colorant to be used without sacrificing color or physical properties.

The present invention also includes a method for making retroreflective articles that does not use a solvent and that obviates the use of a temporary carrier for the optical elements. In this method, the optical elements are applied onto a precursor color coating layer comprising a dye, reflective flakes, and reactive prepolymer components. After the optical elements are applied, the precursor color coating layer is cured. The precursor color coating layer does not contain a solvent that would have to be disposed of in an environmentally sound manmer. By eliminating the cost and waste associated with solvent use and by eliminating the need for a temporary carrier for the optical elements, this method can provide processing and cost benefits over known methods of making retroreflective articles.

GLOSSARY

In reference to the invention, the following terms have the meanings set forth below:

A "binder layer" is a polymeric layer that can add structural integrity to the retroreflective article and may provide assistance in structurally supporting a layer of partially embedded optical elements.

A "colored layer" is a layer that is not colorless or clear.

"Covalent bonds" are those bonds in which valence electrons are shared, examples include carbon-carbon, carbon-nitrogen, and carbon-oxygen bonds.

A "chromophore" means any chemical group, such as the azo group, that gives color to a compound.

A "dye" is an organic or organometallic molecule or moiety that contains a chromophore that absorbs light of a particular wavelength(s) to impart color to the colored layer. In the inventive retroreflective article, the dye shares covalent bond(s) with a polymer.

"Exposed lens retroreflective articles" are retroreflective articles that have optical elements partially embedded in the retroreflective article and partially exposed to the atmosphere.

"Optical elements" are light transmissive elements that are capable of affecting the direction of light that enters the elements so that the light ultimately can be returned toward the light source.

"Polymer" means a molecule that is made up of at least five repeating units that are regularly or irregularly arranged.

"Polymeric" means containing a polymer.

A "polymer precursor" refers to a composition that comprises reactive monomers, oligomers, and/or polymers that are capable of reacting with the reactive dye. During curing, the reactive monomers, oligomers and/or polymers will react to form a higher molecular weight polymeric material.

"Reflective flakes" are solid materials that are composed of a reflective material, capable of suspension in a polymer and that have some surfaces that are larger than the wavelength of visible light.

"Retroreflective" means having the characteristic that obliquely incident incoming light is reflected in a direction antiparallel (180 degrees) to the incident direction, or nearly so, such that an observer at or near the light source can detect the reflected light.

BRIEF DESCRIPTION OF THE DRAWINGS

In the drawings:

FIGS. 1–3 generally depict articles of the invention and are not drawn to scale.

DETAILED DESCRIPTION OF PREFERRED EMBODIMENTS

Figure 1:
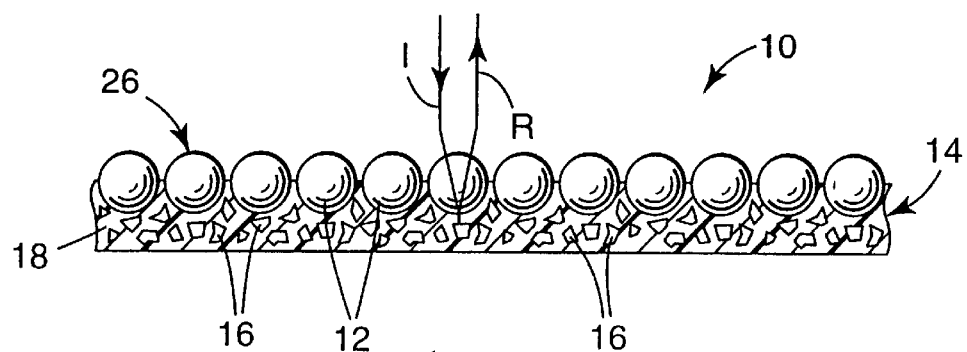
FIG. 1 is a cross-sectional view of a retroreflective article 10 in accordance with the present invention.

FIG. 1 illustrates an exposed lens retroreflective article 10 that includes optical elements such as microspheres 12. The microspheres 12 are partially embedded in a colored layer 14. The colored layer 14 contains reflective flakes 16 that are suspended in polymeric material 18. Incident light I that strikes the retroreflective article's front surface 26 passes through the microspheres 12 and is reflected by reflective flakes 16 to again reenter the microspheres 12, where the direction of the light is then altered to return toward the light source as noted by reflected light beam R. To provide a colored daytime appearance, the polymeric material 18 includes a dye that is covalently bonded to a polymer.

Figure 2:
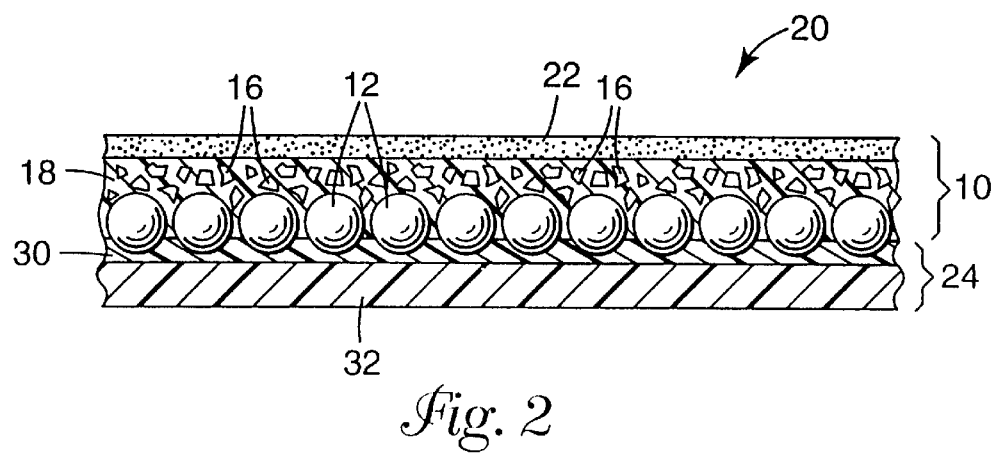
FIG. 2 is a cross-sectional view of a transfer article 20 in accordance with the present invention.

FIG. 2 illustrates a transfer article 20 that is used to make a retroreflective article 10. An adhesive layer 22 and temporary carrier 24 (a strippable layer) are also shown. In a typical application, the adhesive layer 22 is bonded to a fabric substrate (not shown) and the article 10 is attached to an article of clothing. Before or after attaching the retroreflective article 10 to an article of clothing, the temporary carrier 24 is removed. The article 10 may also be attached to the clothing without an adhesive layer 22 by directly sewing the retroreflective article 10 to a fabric substrate or to an article of clothing. If a binder layer (not shown) is present, the binder layer typically comprises a polymer and may contain other materials. The binder layer adheres to the colored layer and may also adhere to an adhesive layer or a fabric backing (not shown). See U.S. Pat. No. 5,812,317 to Billingsley et al. for a disclosure of a binder layer that may suitably be used in the present invention.

The optical elements used in the invention preferably are microspheres that are substantially spherical in shape to provide uniform and efficient retroreflection. The microspheres preferably also are highly transparent to minimize light absorption so that a large percentage of incident light is retroreflected. The microspheres often are substantially colorless but may be tinted or colored in some other fashion. The microspheres may be made from glass, a non-vitreous ceramic composition, or a synthetic resin. In general, glass and ceramic microspheres are preferred because they tend to be harder and more durable than microspheres made from synthetic resins. Examples of microspheres that may be useful in this invention are disclosed in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

The microspheres typically have an average diameter of about 30 to 200 micrometers, and preferably of about 50 to 150 micrometers. Microspheres smaller than this range tend to provide lower levels of retroreflection, and microspheres larger than this range may impart an undesirably rough texture to the retroreflective article or may undesirably reduce its flexibility. Microspheres used in the present invention typically have a refractive index of about 1.2 to 3.0, preferably about 1.6 to 2.2, and more preferably about 1.7 to 2.0.

A variety of polymer forming reagents can be used in the polymer precursor to form the colored layer. Polyols and isocyanates can be reacted to form polyurethanes; diamines and isocyanates can be reacted to form polyureas; epoxides can be reacted with diamines or diols to form epoxy resins; acrylate monomers or oligomers can be polymerized to form polyacrylates; diacids can be reacted with diols or diamines to form polyesters or polyamides. Examples of commercially available polymer forming reagents that may be used in forming the colored layer include: Vitel™ 3550 available from Bostik Inc., Middleton, Mass.; Ebecryl™ 230 available from UBC Radcure, Smryna, Ga.; Jeffamine™ T-5000, available from Huntsman Corporation, Houston, Tex.; CAPA 720, available from Solvay Interlox Inc., Houston Tex.; and Acclaim™ 8200, available from Lyondell Chemical Company (formerly Arco Chemical Co.), Houston, Tex. Examples of reactive polymers useful in forming the colored layer include hydroxyallylenes, polymeric epoxides such as polyalkylene oxides, and copolymers thereof Examples of preferred polyurethane forming methods (into which reactive dyes can be incorporated) are described by Crandall in U.S. Pat. No. 5,645,938, U.S. patent application Ser. No. 08/797,062, and PCT published application WO 96/16343, and by Fleming in U.S. patent application Ser. No. 08/777,718, and PCT published application WO 98/28642. Preferably, the organic polymer to which the dye is bonded is a polyester polyurethane, polyether polyurethane, or a polyurethane that includes a block copolymer of polyether and polyester units.

The polymer precursor can also include an acrylate monomer as a reactive diluent such that the acrylate monomer polymerizes via free-radical polymerization and the other reactive components such as polyols and isocyanates polymerize via a condensation polymerization. The polymerizations may occur contemporaneously. The reactive diluent allows for a higher solids loading level without the viscosity problems associated with handling higher viscosity solutions. It also eliminates the need for solvent and the problems associated with removing the solvent.

The polymer that is used in the colored layer may have functional groups that allow the polymer to be linked to a silane coupling agent, or the reactants that form the polymer may possess such functionality. For example, in producing polyurethanes, the starting materials may possess hydrogen functionalities that are capable of reacting with an isocyanate-functional silane coupling agent; see for example, U.S. Pat. No. 5,200,262 to Li.

Reactive dyes can be used in forming the colored layer. As a percentage of starting materials, the composition used to prepare the colored layer preferably comprises 0.1 to 40 weight % reactive dye, more preferably 0.5 to 20 weight %, and still more preferably 1 to 10 weight % reactive dye. Preferably, the reactive dye is functionalized with reactive groups such as amine, hydroxy, thiol, acylate, and epoxy. More preferably, the reactive dye has at least two reactive groups, such as dihydroxy, since two reactive groups allow for extension of a polymer chain while a single reactive group, such as a monohydroxy dye, would result in chain termination. Examples of commercially available reactive dyes that may be used in forming the colored layer include Reactint™ X3LV, X15, 17AB, X41LV, X64, X77 X80LT, X95AB, and X96 dyes available from Melliken Chemicals, Spartanburg S.C. The dye preferably does not contain heavy metals, particularly metals that may pose toxicity problems such as lead, cadmium, chromium, or mercury (see U.S. Pat. No. 5,286,682 to Jacobs et al.).

Examples of reactive polymer/dye systems useful in forming the colored layer include those described in U.S. Pat. Nos. 3,994,835, 4,026,931, 4,137,243, 4,284,729, 4,507,407 and 4,846,846. In one preferred example, a colored layer is made in a reaction in which a polyether or polyester is reacted with an organic polyisocyanate and a primary-dihydroxyl-functionalized dye.

The colored layer contains reflective flakes suspended in a polymeric material. Preferred reflective flakes include aluminum flakes, mica platelets coated with titania and/or iron oxide, and plate-like crystals of bismuth oxychloride. The flakes typically range in thickness from 0.1 to 0.5 micrometers ($\mu$m) and are up to about 500 $\mu$m in length. The colored layer preferably contains 0.5 to 70 weight % reflective flakes, more preferably 10 to 50 weight %, and still more preferably 20 to 40 weight %. Examples of reflective flakes usable in the present invention include those described in U.S. Pat. Nos. 3,758,192 and 4,763,985. Examples of commercially available reflective flakes that may be used in the colored layer include Afflair™ available from EM Industries, Hawthorne, N.Y. and Mearlite™ available from Mearl Corp., Briarcliff Manor, N.Y. Preferred commercially available flakes include Afflair™ 100, 111, 183, 201, 299, 300, 500, and 600, Mearlite™ Ultra Bright, Mearlite™ Ultrafine, and Mearlite™ G. The colored layer can contain one type or several types of reflective flakes depending on the desired appearance and characteristics of the final article. The combination of reflective flake and reactive dye is also an important consideration. For example, Afflair™ 111 imparts a silver-white appearance and adding Reactint Blue 17AB dye gives a white-blue appearance. Afflair 221™ imparts a blue color, so, combining Afflair 221 with Reactint Blue 17AB produces a deep blue color.

The retroreflective article may have more than one colored layer if, for example, an image or some type of indicia is required. The colored layer is preferably continuous or substantially continuous, thus providing a solidly colored retroreflective article. The colored layer is preferably capable of supporting optical elements and is typically a fluid-impermeable, polymeric, sheet-like layer that has an average thickness of about 1 to 250 $\mu$m. Preferably, the average thickness is about 50 to 150 $\mu$m. Thicknesses less than 50 $\mu$m may be too thin to adhere to both a substrate and the optical elements, and thicknesses greater than 150 $\mu$m may unnecessarily stiffen the article and add to its cost.

For economy and flexibility, the colored layer is typically preferred to be used without a binder layer; however, for greater stiffness or other reasons, the retroreflective article may include a binder layer that is disposed on the colored layer on the side opposite the optical elements. In place of or in addition to, a binder layer, the retroreflective article may include a melt-processable thermoplastic or pressure sensitive adhesive layer, and optionally may include a release liner.

The colored layer and/or binder layer may comprise polymers that contain units such as urethane, ester, ether, urea, epoxy, carbonate, acrylate, acrylic, olefin, vinyl chloride, amide, alkyd, or combinations thereof The colored layer and the binder layer may also contain other ingredients such as fillers, stabilizers (for example, thermal stabilizers and antioxidants such as hindered phenols and light stabilizers such as hindered amines or ultraviolet stabilizers), flame retardants, flow modifiers (for example, surfactants such as fluorocarbons or silicones), plasticizers, and elastomers. Care should be taken when selecting such additives because some may detrimentally affect laundering durability. For example, high levels of flame retardants such as melamine pyrophosphate may have a deleterious effect on the article's retroreflective performance after laundering.

The exposed lens retroreflective articles of the invention can provide a variety of desirable properties. Although the articles can have a retroreflectivity of less than 10 candellas/lux/meter$^2$, the articles typically have an initial retroreflectivity (that is, before being laundered), as measured by the procedure described in the Examples, of at least 50 candellas/lux/meter$^2$, more preferably at least 60 candellas/lux/meter$^2$, and retain at least 10%, more preferably at least 20% of their retroreflected brightness after 20 cycles of the Industrial Laundering Procedure described below.

The exposed lens retroreflective articles of the invention preferably have color retention, as measured by the Color Measurement Procedure described below, such that neither the x or y color coordinates on the standard CIE 1931 chromaticity diagram change (initial color—color after washing) by more than 0.02 and Y does not change more than 20%, more preferably x or y do not change more than 0.01 and Y does not change more than 10%, and still more preferably x or y do not change more than 0.005 and Y does not change more than about 5%, after 20 cycles of the Industrial Laundering Procedure described below. This color measurement was developed by the Commission Internationale de l'Eclairage (CIE) and is based on the fact that any color can be represented as a combination of three primary colors each of which varies as a function of wavelength in the visible spectrum. A color can be objectively specified by the coordinates x, y and z of the chromaticity diagram that are needed to match a particular color. The values of x Y, and Z are measures of the amount of color having CIE coordinates x, y, and z and are defined by the equations: $Y=y(X+Y+Z)$, $X=x(X+Y+Z)$, and $Z=z(X+Y+Z)$. Since $x+y+z=1$, and substituting $Y/y=(X+Y+Z)$ into the foregoing equations shows that a color (with intensity) can be completely defined by x, y and Y. Another commonly used measurement of color in the CIE system is $E^*$. The exposed lens retroreflective articles of the invention preferably have a color retention, as measured by the Color Measurement Procedure described below, such that the change in $E^*$ (initial color—color after washing, or $E^*$) is less than 8, and more preferably $E^*$ is less than 4 after 20 cycles of the Industrial Laundering Procedure described below. The CIE color system is described in references such as Wyszecki and Stiles, Color Science, 2nd ed., John Wiley & Sons, 1982; and Judd, Color in Business, Science, and Industry, John Wiley & Sons, 1952.

As shown in FIG. 2, a retroreflective article 10 can be made by first forming transfer article 20. In producing the transfer 20, a multitude of microspheres 12 can be cascaded onto a temporary carrier 24 in a desired temporary arrangement. A "carrier" is a web onto which the optical elements are temporarily positioned so that the colored layer can be applied onto it. The carrier is temporary because it is removed before the retroreflective article 10 is used. Microspheres 12 preferably are packed as closely as possible on the carrier 24 and may be so arranged by any convenient process, such as printing, screening, cascading, or with a hot can roll. The microspheres 12 are partially embedded in the carrier 24, typically to about 30 to 60 percent of the microspheres' diameter. The portions of the microspheres 12 that are not embedded in carrier 24 protrude from it so that they can subsequently receive the colored layer.

Carrier 24 can include a heat softenable polymer layer 30 on a paper sheet 32. Examples of useful polymer layers 30 for carrier web 24 include: polyvinyl chloride; polyolefins such as polyethylene, polypropylene, and polybutylene; and polyesters; et cetera. For a further discussion of applying microspheres to the carrier web, see U.S. Pat. Nos. 4,763,985; 5,128,804; and 5,200,262.

Polymeric layer 18 retains microspheres 12 in the desired arrangement. Depending in part on the characteristics of the carrier web 28 and microspheres 12, it may be desirable to condition carrier 24 and/or microspheres 12 by applying selected release agents or adhesion promoters to achieve desired carrier release properties.

After the microspheres are partially embedded in temporary carrier 24, the precursor color coating is placed on the exposed portions of the microspheres. The colored layer can be made by reacting polymers, oligomers, or monomers with the appropriate, chemically reactive dye. This can be accomplished, for example, by applying a solution of prepolymer components and reactive dye onto the protruding portions of the microspheres. A coupling agent (typically a silane, but may be other compounds such as titanate or zirconate coupling agents) may be added for enhanced adhesion to the microspheres. After applying the solution, it preferably is only partially cured and a fabric preferably is embedded in the color layer composition before curing. The fabric is secured to the color layer on the side opposite the microspheres 12. Alternatively, if a fabric is not used, an adhesive may be applied to the colored layer or to a binder layer (or to the binder layer composition before curing).

As an alternative to the above-described process utilizing a carrier for the microspheres, the precursor color coating can be applied to a substrate such as fabric, a release layer, or a transfer film (such as a thermoplastic polyester or polyurethane film), and the microspheres can be spread over the uncured or only partially cured precursor color coating. In a related technique (see U.S. Pat. No. 3,758,192, col. 10, line 60—col. 11, line 2), Bingham states that solvent is required to allow leafing of the nacreous pigment. The bead-spreading method of the present invention avoids the use of a solvent in forming the colored layer. By using reactive dyes and polymer precursors rather than conventional pigments and polymers dissolved in solvent, the inventive methods allow the formation of reflecting colored layers having desirable properties (as described herein) without the necessity of using solvents. For example, the solventless precursor color solutions of Examples 1–4 can be utilized in a bead-spreading technique. Also the bead-spreading technique illustrated in Examples 5 and 6 can be conducted equally successfully without the addition of a solvent such as methylethyl ketone.

In the case of reacting a dye with polyisocyanates, the reactive functional groups on the dye compound may include hydroxyls, amines, and/or thiols. A retroreflective article having good color and retroreflectivity durability properties can be obtained by reacting a polyether polyol, such as Acclaim™ 2220, with an isocyanate, a hydroxyl-functionalized reactive dye, and an isocyanatosilane. The reactive dye and isocyanate react with the polyols to form a colored, crosslinked polymer in a hardened layer. The isocyanatosilane binds to the surface of the microspheres and reacts with the polymer, and thus binds the transparent microspheres to the colored layer.

The inventive retroreflective articles may be applied to substrates using mechanical methods such as sewing. In some applications, however, it is desired to secure the article to the substrate by an adhesive layer. The adhesive layer can be, for example, a pressure-sensitive adhesive, a heat-activated adhesive, or an ultraviolet-radiation-activated adhesive.

The substrate bearing the retroreflective article can be located on the outer surface of an article of clothing, enabling the retroreflective article to be displayed when the clothing is worn in its normal orientation on the person. The substrate may be, for example: a woven or nonwoven fabric such as a cotton fabric; a polymeric layer including nylons, olefins, polyesters, cellulosics, urethanes, vinyls, acrylics, rubbers; leather; and the like.

Figure 3:
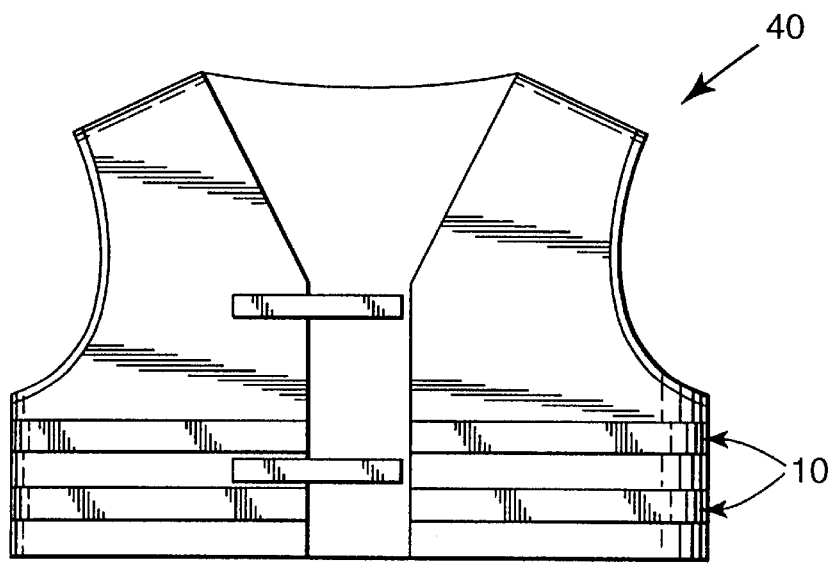
FIG. 3 illustrates a safety vest 40 that displays a retroreflective article 10 in accordance with the present invention.

FIG. 3 illustrates a safety vest 40, displaying a retroreflective article 10 that is in the form of an elongated sheeting or strip, typically one to three inches wide. Safety vests often are worn by road construction workers to improve their visibility to oncoming motorists. These kinds of vests frequently come into contact with dirt and grime and therefore need to be able to withstand harsh cleaning conditions so that the vest can be reused a number of times.

Although a safety vest 40 has been chosen for illustration, the article of clothing of the invention may come in a variety of forms. As the term is used herein, "article of clothing" means a launderable item of wearing apparel sized and configured to be worn or carried by a person. Other examples of articles of clothing that may display retroreflective articles of the invention include shirts, sweaters, jackets (e.g. firefighters' jackets), coats, pants, shoes, socks, gloves, belts, hats, suits, one-piece body garments, bags, backpacks, et cetera.

Advantages and other properties and details of this invention are further illustrated in the following Examples. It is to be expressly understood, however, that while the examples serve this purpose, the particular ingredients and amounts used and other conditions are not to be construed in a manner that would unduly limit the scope of this invention. For example, while the Examples illustrate inventive methods that produce products on an individual basis, the processes can also be performed continuously. The Examples selected for disclosure are merely illustrative of how to make a preferred embodiment of the invention and how the articles can generally perform.

EXAMPLES

The following tests and procedures were used in the examples.

Industrial Laundering Procedure

Launderability was evaluated by washing and drying a piece of fabric to which the retroreflective article was applied. The combined sequence of washing and drying is referred to as a cycle. The samples were washed using a Milnor System 7 Washing Machine Model 30015M4G from Pellerin Milnor Corp. In accordance with program no. 7 for heavily soiled, colored fabrics. The fabric was a 100 percent cotton towel, and the retroreflective article was secured to the fabric by sewing. The washer was loaded with enough pieces (approximately 80) of fabric (about 45 centimeters (cm) by 75 cm) to make a 28 pound load including from one to four pieces of fabric having several (typically about 5) retroreflective articles of the invention about 5 by 15 centimeters in size secured thereto.

The cleaning agents used were 90 ml of Lever Tech Ultra, a detergent (from Lever Industrial, N.C., S.C.) containing, by weight, approximately 10 percent potassium hydroxide, 25 percent potassium citrate, and 2 percent ethoxylated lauryl alcohol (the remaining contents are not known by the inventors), and 120 nd of Lever Tech Booster (a pH builder also from Lever Industrial) containing 20 percent sodium hydroxide (the remaining contents are not known by the inventors). In Program No. 7 the following steps are carried out to complete the washing portion of a cycle:

| Operation | Time (minutes) |
| --- | --- |
| Suds | 20.5 |
| Flush | 2 |
| Flush | 7 |
| Flush | 7 |
| Flush | 2 |
| Hot Rinse | 2 |
| Split Rinse | 2 |
| Cold Rinse | 4 |
| Extract | 6 |
| Total | 52.5 (55.0*) |

*Total time in minutes, which includes approximate fill times.

In the suds step, hot water (68 liters at 80° C.) and the cleaning agents are introduced into the machine washing basket under agitation. In the flush steps, fresh hot water (68 liters at 80° C.) is added to the washing basket after the same amount of the old water containing the cleaning agents is purged.

The rinse steps essentially are the same as the flush steps except the water becomes cooler. In the first rinse, the water is approximately 80° C., in the second rinse (split rinse), the water is approximately 46° C., and in the final cold rinse, the water is approximately 18° C. The washing basket is agitated during the flush and rinse steps. In the extract step, the machine undergoes a high-speed spin cycle to remove water from the washed samples. After washing but before being tested for retroreflectivity, the samples were dried by either Procedure 1 in a Maytag™ home dryer at 60° C. (140° F.) on regular setting for about 30–35 minutes or by Procedure 2 in a drying oven (Despatch Style V-27 from Despatch Oven Company) at 177° C. (350° F.) for 10 minutes. Procedure 1 is commonly recognized as being a tumble drying operation, whereas Procedure 2 is designed to represent a tunnel finish operation. Completion of the drying procedure marks the completion of an industrial wash cycle. After the designated number of cycles, the retroreflective brightness at the middle of each sample was determined.

Retroreflective Brightness

Retroreflective brightness was measured according to ASTM Test Specification E-810–94, entitled "Standard Test Method for Coefficient of Retroreflection of Retroreflective Sheeting", using an observation angle of 0.2° and an entrance angle of −4°. The retroreflective brightness is reported as a Coefficient of Retroreflection in units of candelas per lux per square meter (candelas/lux/m$^2$). An "initial" Coefficient of Retroreflection is one that has been ascertain before the retroreflective article has been washed.

Color Measurement Procedure

CIE color coordinates, as described in ASTM E308, were measured using a Hunter LabScan color measurement apparatus using a D65 fight source, with 0/45° geometry. The term 0/45 means that the illuminating light source is shining at the surface at an angle of approximately 0 degrees from normal to the surface, and the color measurement is made by looking at an angle of approximately 45 from normal to the surface. Color measurements were made on circular samples having diameters of 2.5 centimeters (1 inch).

| Component Sources | |
| --- | --- |
| Component | Source |
| Washing machine | Pellerin Milnor Corporation, P. O. Box 400, Kenner, Louisiana 70063 |
| Primalux ™ and Excellerate ™ fabrics | Springs Industries Inc., 420 West White Street, Rock Hill, South Carolina 29730 |
| Lever Tech Ultra ™ detergent | Lever Industrial, North Charleston, South Carolina 29418 |
| Maytag ™ home dryer | Maytag, Newton, Iowa 50208 |
| Acclaim ™ 2220 polyether polyol | Arco Chemical, New Town Square, Pennsylvania |
| A-1310 silane | OSI Specialties Inc., 39 Old Ridgebury Road, Danbury, Connecticut 06810 |
| Syn Fac 8009 polyol | Milliken Chemicals, Spartanburg, South Carolina 29304 |

-continued

Component Sources

| Component | Source |
|---|---|
| Capa 720 polyol | Solvay Interlox Inc., Houston, Texas |
| dibutyltinlaurate catalyst | Witco Corp., Greenwich, Connecticut |
| Milliken Reactint ™ X15 yellow dye, X64 red dye, and X80 violet dye | Milliken Chemicals, Spartanburg, South Carolina 29304 |
| Afflair ™ 111 Pearlescent Flake | EM Industries, Hawthorne, New York |
| Mondur ML aromatic diisocyanate | Bayer Corp., Pittsburgh, Pennsylvania |
| Voranol 234-630 x-linker | Dow Chemicals Inc., Midland, Michigan |
| FC-430 wetting agent | 3M, St. Paul, Minnesota |
| Bemis 5250 transfer film adhesive | Bemis Associates, Shirley, Massachusetts |
| Isooctyl acrylate | 3M, St. Paul, Minnesota |
| Ultrabrite UFI | Mearl Corp. Briarcliff Manor, New York |
| Benzoyl peroxide catalyst | Aldrich Chemical Co., Milwaukee, Wisconsin |

Example 1

A microsphere carrier was prepared in the manner described in U.S. Pat. No. 5,474,827. Glass nicrospheres having a refractive index of about 1.9 and diameters of 40–90 micrometers were cascaded onto a polyethylene layer carried on a paper backing, in a manner which encouraged closest packing of the microspheres. The polyethylene layer was heated, and the microspheres were sunk into the polyethylene to a depth of about half the diameter of the nicrospheres so that a portion of the microspheres remained exposed above the surface of the polyethylene.

A colored layer coating solution was prepared by combining the following ingredients and stirring for 6 hours at 500 rpm with a propeller mixer:

| 44.42 grams (g) | Acclaim ™2220 |
|---|---|
| 9.93 g | Syn Fac ™8009 |
| 3.64 g | Voranol ™234–630 |
| 29.05 g | Afflair ™111 |

Then 43.65 grams of the above polyol/pearlescent solution was combined with 1.0 g Reactint™ X64 red dye, 7.62 g Mondur ML, 1.8 g A-1310, and 2 drops dibutyltinlaurate and stirred by hand. The A-1310 is a silane coupling agent to promote bead-bonding; the Syn Fac™ is a chain extender to increase elasticity; and the Voranol™ is a cross-linker to increase temperature stability.

The resulting precursor color coating solution was coated onto the microspheres of the beadcoat carrier using a notched bar coater having the metering bar set at a gap of 6 (mils (150 μm) above the surface of the microspheres. The coating was partially cured by forced air heating at 105° C. (220° F.) for three minutes. Fabric was then applied to the softened color layer and additional curing was conducted at 105° C. (220° F.) for nine minutes. After 3 days, the carrier web was stripped away to yield an exposed lens retroreflective fabric that displayed a red daytime color and that had an initial coefficient of retroreflection of 69.7 candelas/lux/m².

Color and Retroreflective Brightness were measured before and after subjecting the sample to 20 Industrial Wash Cycles in a Manor industrial washer as described in the Industrial Laundering Procedure (including both drying procedures). After 20 Industrial Wash Cycles using drying procedure (1), the article retained 23% of its retroreflected brightness. After 20 industrial wash cycles using drying procedure (2), the article retained 41% of its retroreflected brightness.

The CIE color coordinates before and after 20 industrial wash cycles using drying procedures (1) and (2) were as follows:

| CIE Coordinates: | Y | x | y |
|---|---|---|---|
| Initial Color | 22.47 | .4142 | .3085 |
| Color After 20 Cycles (1) | 24.4 | .4323 | .3067 |
| Color After 20 Cycles (2) | 23.36 | .4341 | .3105 |

The change in E* (procedure 1) was 7.4 and (procedure 2) 6.3.

This data show that the retroreflective article had substantial retention of color and retroreflectivity after 20 laundering cycles. The data also shows that the visual aesthetics of the fabric sample was substantially retained after 20 laundering cycles.

Example 2

This example was prepared in the same manner as Example 1 but with the following changes.

A colored layer coating solution was prepared by combining the following ingredients and stirring for 2 hours at 500 rpm with a propeller mixer:

| 40.03 grams (g) | Acclaim ™2220 |
|---|---|
| 9.94 g | Syn Fac ™8009 |
| 3.63 g | Voranol ™234–630 |
| 15.06 g | Afflair ™111 |

Then 34.36 grams of the above polyol/pearlescent solution was combined with 1.05 g Reactint™ X15 yellow dye, 7.52 g Mondur ML, 1.87 g A-1310, and 2 drops dibutyltinlaurate and stirred by hand. The resulting precursor color coating solution was coated onto the microspheres of the beadcoat carrier using a notched bar coater having the metering bar set at a gap of 6 mils (150 μm) above the surface of the microspheres. The coating was partially cured by forced air heating at 105° C. (220° F.) for 3 minutes. Fabric was then applied to the softened color layer and additional curing was conducted at 105° C. (220° F.) for 16 minutes. After 1 day, the carrier web was stripped away to yield an exposed lens retroreflective fabric that displayed a yellow daytime color and that had an initial coefficient of retroreflection of 45.6 candelas/lux/m².

After 20 Industrial Wash Cycles using drying procedure (1), the article retained 7% of its retroreflected brightness. After 20 Industrial Wash Cycles using drying procedure (2), the article retained 14% of its retroreflected brightness.

The CIE color coordinates before and after 20 industrial wash cycles using drying procedures (1) and (2) were as follows:

| CIE Coordinates: | Y | x | y |
|---|---|---|---|
| Initial Color | 61.66 | .3954 | .4487 |
| Color After 20 Cycles (1) | 66.01 | .3956 | .4525 |
| Color After 20 Cycles (2) | 58.74 | .4019 | .4449 |

The change in E* (procedure 1) was 3.7 and (procedure 2) 3.9.

This data show that the retroreflective article had substantial retention of color and retroreflectivity after 20 laundering cycles. The data also shows that the visual aesthetics of the fabric sample was substantially retained after 20 laundering cycles.

Example 3

This example was prepared in the same manner as Example 1 but with the following changes.

A colored layer coating solution was prepared by combining the following ingredients and stirring for 3 hours at 500 rpm with a propeller mixer:

| | |
|---|---|
| 40.06 grams (g) | Acclaim ™2220 |
| 9.95 g | Syn Fac ™8009 |
| 3.66 g | Voranol ™234–630 |
| 30.01 g | Afflair ™111 |

Then 41.83 grams of the above polyol/pearlescent solution was combined with 3.08 g Reactint™ X64 red dye, 7.51 g Mondur™ ML, 1.8 g A-1310, and 2 drops dibutyltinlaurate and stirred by hand. The resulting precursor color coating solution was coated onto the microspheres of the beadcoat carrier using a notched bar coater having the metering bar set at a gap of 6 mils (150 $\mu$m) above the surface of the microspheres. The coating was partially cured by forced air heating at 105° C. (220° F.) for three minutes. Fabric was then applied to the softened color layer, and additional curing was conducted at 105° C. (220° F.) for nine minutes. After 1 day, the carrier web was stripped away to yield an exposed lens retroreflective fabric that displayed a red daytime color and that had an initial coefficient of retroreflection of 58.9 candelas per lux per square meter.

Example 4

The following components were combined in a glass jar:

| | |
|---|---|
| 38.87 g | Capa 720 |
| 5.97 g | Syn Fac 8009 |
| 1.79 g | Voranol 234–630 |
| 0.12 g | FC-430 |
| 19.98 g | Afflair 123 |
| 0.29 g | Reacting Violet X80 |

The mixture was warmed on a hot plate with stirring at 1200 rpm using a propeller mixer for 14 hours. The mixture was then degassed under 100 millitorr vacuum for 15 minutes. 33.4 g of the above mixture was transferred to another jar. 5.15 g Mondur ML, 1.0 g A-1310 and 1 drop dibutyltinlaurate (DBTDL) was added to the mixture and stirred. The mixture was notch-bar coated onto silicone release paper and cured in the oven for 3 minutes at 110° C. (230° F.). The coating on release paper was removed from the oven and the surface of the coating was flooded with glass microspheres. The sample was then returned to the oven for 5 minutes.

The final cured sample had as aesthetically pleasing violet color and exhibited a coefficient of retroreflection of 64 candelas/lux/m². The sample was removed from the release paper and laminated to a 100% polyester fabric using a Bemis™ 5250 transfer film adhesive. The laminating conditions were 20 seconds at 166° C. (330° F.) and 40 pounds per square inch (psi). The sample was retested for Retroreflective Brightness and had an initial coefficient of retroreflectivity of 47 candelas/lux/m². After 10 Industrial Washing Cycles (procedure 1), the sample maintained 66% of its initial retroreflectivity.

Examples 5 and 6 demonstrate the use of an acrylate monomer as a reactive diluent that polymerizes via free-radical polymerization while polyols and polyisocyanates polymerize via condensation polymerization.

Example 5

Ten (10.0) g isooctyl acrylate (IOA) and 10.0 g Ultrabrite UFI were added to an 8 ounce jar and rolled on a continuous roller for 14 hours. Then 19.4 g CAPA 720, 3.0 g Syn Fac™ 8009, 0.89 g Voranol™ 234–630, and 10.0 g Ultrabrite™ UFI were added to the mixture. 2.0 g IOA, 0.5 g methylethyl ketone (MEK) and 0.2 g benzoylperoxide were premixed to dissolve the benzoylperoxide and this solution was added to the mixture and the mixture rolled on a roller for 18 hours. 5.3 g Mondur ML, 1.0 g A-1310, 2 drops DBTDL, and 0.2 g Reactint Yellow X15 were added to the mixture and stirred. The resulting mixture was notch-bar coated onto silicone release paper and cured in an oven for 4 minutes at 110° C. (230° F.). The coating on release paper was removed from the oven and the surface of the coating was flooded with glass microspheres. The sample was then returned to the oven for 10 minutes.

The final cured sample had as aesthetically pleasing yellow color and an initial coefficient of retroreflection of 130 candelas per lux per square meter.

Example 6

Forty (40.0) g isooctyl acrylate (IOA) and 50.0 g Ultrabrite UFI were added to an 8 ounce jar and rolled on a continuous roller for 14 hours. 30.0 g of this mixture was transferred to a glass jar and 19.53 g CAPA 720, 2.95 g Syn Fac 8009, 0.88 g Voranol 234–630, and 0.4 g Reactint Red X64 were added to the mixture. 2,2 g MEK and 0.2 g benzoylperoxide were premixed to dissolve the benzoylperoxide and this solution was added to the mixture and the mixture rolled on a roller for 15 minutes. 5.2 g Mondur ML, 1.0 g A-1310, and 3 drops DBTDL were added to the mixture and stirred. The resulting mixture was notch-bar coated onto an 80/20 polyester/cotton blend fabric and cured in an oven for 4 minutes at 110° C. (230° F.). The coating on the fabric was removed from the oven, and the surface of the coating was flooded with glass microspheres. The sample was then returned to the oven for 10 minutes.

The final cured sample had as aesthetically pleasing red color and had an initial coefficient of retroreflection of 150 candelas per lux per square meter.

The disclosures of all patents and patent applications cited above including those cited in the Background, are incorporated by reference into this document as if reproduced in full. The disclosure of cofiled U.S. patent application Ser. No. 09/334,729 (attorney docket number 53977USA2A) entitled *Retroreflective Article Having A Colored Layer Containing A Dye Covalently Bonded To A Polymer* by Billingsley et al.

The invention may be suitably practiced in the absence of any item or element not described above.

What is claimed:

1. A method of making a colored retroreflective article, which method comprises:

contacting a precursor color coating with optical elements, wherein the precursor color coating comprises a reactive dye, reflective flakes, and a polymer precursor; and curing the precursor color coating to form a colored layer that contains the reflective flakes, that has the dye covalently bonded to a polymer, and that has the optical elements supported by the colored layer, wherein the precursor color coating does not contain solvent, and wherein the precursor color coating is applied to release paper, and then the optical elements are applied over the precursor color coating wherein the optical elements are not disposed in a carrier layer.

2. A solventless method of making a retroreflective article, which method comprises:

applying a solventless precursor color coating layer on the surface of a substrate, wherein the precursor color coating layer comprises a dye, reflective flakes, and a polymer precursor;

applying optical elements onto the precursor color coating layer, wherein the optical elements are not disposed in a carrier layer; and curing the precursor color coating to form a colored layer.

3. The method of claim 2 wherein the optical elements are light transmissive microspheres.

4. The method of claim 2 wherein the dye is a reactive dye.

5. The method of claim 3, wherein the microspheres are spread out over the surface of the precursor color coating.

6. The method of claim 2 wherein the polymer precursor comprises an acrylate monomer, a polyol, and an isocyanate.

* * * * *

UNITED STATES PATENT AND TRADEMARK OFFICE
CERTIFICATE OF CORRECTION

PATENT NO. : 6,306,459 B1
DATED : October 23, 2001
INVENTOR(S) : Robert J. Fleming It is certified that error appears in the above-identified patent and that said Letters Patent is hereby corrected as shown below:

<u>Title page, Item [54] and Column 1, line 1,</u>
"RETROFLECTIVE" should read as -- RETROREFLECTIVE --.

<u>Column 2,</u>
Line 6, "retroreflective" should read as -- retroreflectivity --.

<u>Column 4,</u>
Line 19, "retroreflective" should read as -- retroreflectivity --.
Line 63, "manmer" should read as -- manner --.

<u>Column 7,</u>
Line 45, "Melliken" should read as -- Milliken --.

<u>Column 11,</u>
Line 46, "nd" should read as -- ml --.

<u>Column 12,</u>
Line 43, "fight" should read as -- light --.

<u>Column 13,</u>
Line 24, "nicrospheres" should read as -- microspheres --.
Line 31, "nicrospheres" should read as -- microspheres --.

<u>Column 18,</u>
Line 9, "3" should read as -- 2 --.

Signed and Sealed this

Twenty-first Day of January, 2003

JAMES E. ROGAN
*Director of the United States Patent and Trademark Office*